United States Patent
Zhao et al.

(10) Patent No.: US 9,976,873 B2
(45) Date of Patent: May 22, 2018

(54) DETECTION DEVICE AND WORKPIECE CLEANING APPARATUS COMPRISING THE SAME

(71) Applicants: BOE TECHNOLOGY GROUP CO., LTD., Beijing (CN); HEFEI BOE OPTOELECTRONICS TECHNOLOGY CO., LTD., Hefei, Anhui Province (CN)

(72) Inventors: Yinchu Zhao, Beijing (CN); Haibin Liu, Beijing (CN); Baogui Cao, Beijing (CN); Peihuan Ning, Beijing (CN); Zhendong Wang, Beijing (CN); Dan Li, Beijing (CN)

(73) Assignees: BOE TECHNOLOGY GROUP CO., LTD., Beijing (CN); HEFEI BOE OPTOELECTRONICS TECHNOLOGY CO., LTD, Hefei (CN)

( * ) Notice: Subject to any disclaimer, the term of this patent is extended or adjusted under 35 U.S.C. 154(b) by 0 days. days.

(21) Appl. No.: 15/325,414

(22) PCT Filed: Jan. 13, 2016

(86) PCT No.: PCT/CN2016/070773
§ 371 (c)(1),
(2) Date: Jan. 10, 2017

(87) PCT Pub. No.: WO2017/031930
PCT Pub. Date: Mar. 2, 2017

(65) Prior Publication Data
US 2017/0205249 A1    Jul. 20, 2017

(30) Foreign Application Priority Data
Aug. 24, 2015  (CN) .......................... 2015 1 05424814

(51) Int. Cl.
*G01D 5/12* (2006.01)
*B08B 13/00* (2006.01)
*B08B 3/02* (2006.01)

(52) U.S. Cl.
CPC ............... *G01D 5/12* (2013.01); *B08B 3/022* (2013.01); *B08B 13/00* (2013.01)

(58) Field of Classification Search
CPC ............ G01D 5/12; G01D 5/125; G01D 5/14; G01D 5/142; B08B 13/00; B08B 3/022;
(Continued)

(56) References Cited

U.S. PATENT DOCUMENTS 7,701,203 B2 *  4/2010  Fouts .................... F16H 59/044
324/207.2
9,460,875 B2 * 10/2016  Penning ................. H01H 36/00
(Continued)

FOREIGN PATENT DOCUMENTS

CN  1469070 A  1/2004
CN  1590951 A  3/2005
(Continued)

OTHER PUBLICATIONS

English machine translation of Fu et al. CN 204416428.*
(Continued)

*Primary Examiner* — Tung X Nguyen
*Assistant Examiner* — Lee Rodak
(74) *Attorney, Agent, or Firm* — Womble Bond Dickinson (US) LLP (57) ABSTRACT

A detection device including a base, a bracket, a swing lever, a first limit lever and a first magnetic sensor is disclosed. The bracket is on the base, the swing lever is swingably on the bracket via a swing shaft and the swing lever is partitioned as a toggle section and a trigger section by the swing shaft, the weight of the trigger section being greater than that of the (Continued)

toggle section. An end of the trigger section is provided with a magnet, and an end of the toggle section is higher in an initial state than an upper edge of the bracket. The first limit lever is on the bracket for limiting the trigger section. The first magnetic sensor is on the bracket and in the vicinity of a virtual extension of the trigger section when the trigger section is limited by the first limit lever.

20 Claims, 4 Drawing Sheets

(58) Field of Classification Search
CPC ........... B08B 3/024; B08B 3/026; B08B 3/04; B08B 3/041; B65H 2220/01; B65H 2220/02; B65H 2220/03; B65H 2511/00; B65H 2511/13; B65H 2511/51; B65H 2513/40; B65H 2515/112; B65H 2515/34; B65H 2553/22; B65H 2553/612; B65H 7/02; B65H 2406/122; B65G 49/064
USPC ............. 324/207.11, 207.13, 207.2, 207.21, 324/207.22, 207.26
See application file for complete search history.

(56) References Cited

U.S. PATENT DOCUMENTS

| | | |
|---|---|---|
| 2003/0234050 A1 | 12/2003 | Misumi |
| 2005/0046415 A1 | 3/2005 | Kato et al. |
| 2015/0153219 A1* | 6/2015 | Li .............................. B65H 7/02 73/649 |
| 2015/0300801 A1* | 10/2015 | Xie ....................... B65G 49/064 324/207.15 |
| 2016/0320213 A1* | 11/2016 | Li ........................... F16K 31/06 |

FOREIGN PATENT DOCUMENTS

| | | | |
|---|---|---|---|
| CN | 1711184 A | | 12/2005 |
| CN | 202621629 U | | 12/2012 |
| CN | 103633000 A | | 3/2014 |
| CN | 204416428 | * | 6/2015 |
| CN | 204416428 U | | 6/2015 |
| CN | 105107776 A | | 12/2015 |
| DE | 10 2005 060676 A1 | | 6/2007 |
| EP | 1205142 A2 | | 5/2002 |
| JP | H 01109209 A | | 4/1989 |
| JP | H 08290710 A | | 11/1996 |
| JP | 2010129668 A | | 6/2010 |
| KR | 20110049302 A | * | 5/2011 |
| KR | 20140026256 A | * | 3/2014 |

OTHER PUBLICATIONS

English machine translation of Jeon et al. KR 20110049302.*
English machine translation of Hamada et al. KR 20140026256.*
Office Action in Chinese Application No. 201510524814.X dated Sep. 18, 2016, with English translation. 6 pages.
International Search Report and Written Opinion in PCT/CN2016/070773 dated Jun. 7, 2016, with English translation. 16 pages.
Office Action in Chinese Application No. 201510524814.X dated Feb. 16, 2017, with English translation. 7 pages.

* cited by examiner

DETECTION DEVICE AND WORKPIECE CLEANING APPARATUS COMPRISING THE SAME

TECHNICAL FIELD

The present application relates to the field of liquid crystal display manufacturing technology, and particularly to a detection device and a workpiece cleaning apparatus.

BACKGROUND

In a workpiece cleaning apparatus used in the prior art TFT-LCD (Liquid Crystal Flat Panel Display) industry, a detection device is required to detect positional information of a workpiece during conveying and cleaning of the workpiece and to send a detection signal to the control system of the apparatus.

The existing detection device generally employs an optical fiber sensor or a proximity switch. The optical fiber sensor includes an emitter and a receiver, and the emitter and the receiver are both mounted above the conveyor section of the workpiece cleaning apparatus. In use, when a workpiece is conveyed to the conveyor section, light emitted from the emitter is reflected by the workpiece, and the reflected light is received by the receiver, thereby the position of the workpiece is measured. The controller of the apparatus can control the switch to be on or off based on a signal. However, it is further required to spray liquid to clean the workpiece when the workpiece is conveyed in the conveyor section, and light would be refracted and reflected by the liquid. Therefore, when light is refracted, there exist detection errors; when light is reflected, the light emitted from the emitter may be reflected into the receiver, resulting in false control. Consequently, there is a risk of occurrence of workpiece collision. The proximity switch achieves the purpose of controlling the switch to be on or off by making use of the displacement sensor's characteristic of being sensitive to a proximal object. The proximity switch is excellent in stability but poor in water resistance, thus it cannot be used in a liquid environment.

Meanwhile, in the TFT-LCD industry, high-pressure deionized water (De-Ion water) is generally used for washing. Since the pressure of the high-pressure deionized water is detected using the water inlet pressure in the pipeline, the water outlet pressure and abnormalities in use (including the problems such as excessive water pressure resulting from nozzle falling-off, pipe crack, abnormal spraying direction, and so on) cannot be detected accurately and effectively, so that abnormalities including abnormal cleaning, remaining water stains upon drying, and the like would consequently occur.

SUMMARY

A detection device which can be used in a liquid environment to accurately detect the position of a workpiece to be conveyed is proposed.

In one aspect, the present application provides a detection device characterized by comprising a base, a bracket, a swing lever, a first limit lever and a first magnetic sensor. The bracket is provided on the base, the swing lever is swingably provided on the bracket via a swing shaft and the swing lever is partitioned as a toggle section and a trigger section by the swing shaft, the weight of the trigger section being greater than the weight of the toggle section. An end of the trigger section is provided with a magnetic block, an end of the toggle section is higher in an initial state than an upper edge of the bracket. The first limit lever is provided on the bracket for limiting the trigger section. The first magnetic sensor is provided on the bracket and located in the vicinity of a virtual extension of the trigger section when the trigger section is being limited by the first limit lever.

In accordance with an optional embodiment, the detection device further comprises a second limit lever and a second magnetic sensor, the second limit lever is provided on the bracket and arranged triangularly with the swing shaft and the first limit lever in a plane of the bracket, the trigger section is able to swing between the first limit lever and the second limit lever, and the second magnetic sensor is provided on the bracket and located in the vicinity of a virtual extension of the trigger section when the trigger section is being limited by the second limit lever.

In accordance with an optional embodiment, the bracket comprises a first bracket plate and a second bracket plate arranged in parallel with each other and spaced apart, the first bracket plate and the second bracket plate are vertically fixed to the base, and the limit lever and the swing shaft are both disposed across the first bracket plate and the second bracket plate.

In accordance with an optional embodiment, an end of the toggle section is provided with a pulley.

In accordance with an optional embodiment, an end of the trigger section is provided with a mounting hole in which the magnetic block is arranged and sealed with an end cap.

In accordance with an optional embodiment, at least one of the first limit lever and the swing lever is made of a conductive ultrahigh molecular weight polyethylene material.

In accordance with an optional embodiment, the second limit lever is made of a conductive ultrahigh molecular weight polyethylene material.

In accordance with an optional embodiment, at least one of the base, the bracket and the swing lever is made of a conductive ultrahigh molecular weight polyethylene material.

In accordance with an optional embodiment, the detection device generates a corresponding detection result in the event that a time period in which the magnetic sensor continuously detects a magnetic field signal exceeds a time threshold.

In accordance with an optional embodiment, the trigger section of the swing lever is close to the first magnetic sensor in an initial state and gets away from the first magnetic sensor under the effect of a gravity applied by a workpiece that passes over the detection device so as to detect whether the workpiece passes over the device or not.

In accordance with an optional embodiment, the trigger section of the swing lever is close to the first magnetic sensor in an initial state and gets away from the first magnetic sensor under the effect of a gravity applied by a workpiece that passes over the detection device so as to detect whether the workpiece passes over the device, and the trigger section of the swing lever gets close to the second magnetic sensor under the effect of an excessive pressure applied on the workpiece by a cleaning liquid sprayed by a spray device so as to detect whether the spray device is normal or not.

In another aspect, the application further provides a workpiece cleaning apparatus comprising at least one above detection device.

The detection device according to the embodiments of the present invention is simple in structure and easy to implement and install. Moreover, it employs a magnetic sensor to detect magnetic field signals, which can reduce detection errors and improve the accuracy of detection since the magnetic sensor is unaffected by liquid or a humid environment.

BRIEF DESCRIPTION OF THE DRAWINGS

The drawings are included to provide further understanding of the embodiments and the drawings are incorporated into the description and constitute a part thereof. The drawings illustrate the embodiments and are used for interpreting the principle of the embodiments together with the depiction. It would be easy to recognize other embodiments and many expected advantages of the embodiments because they would become better understood by reference of the detailed description below. The elements of the drawings are not necessarily drawn to scale. The same reference numerals denote corresponding similar components.

In the drawings: 1: base; 2: bracket; 21: first bracket plate; 22: second bracket plate; 31: first magnetic sensor; 32: second magnetic sensor; 4: workpiece; 5: swing lever; 5-1: toggle section; 5-2: trigger section; 51: pulley; 52: magnetic block; 6: swing shaft; 71: first limit lever; 72: second limit lever.

DETAILED DESCRIPTION

To make the objective, technical solutions and advantages of embodiments of the present invention clearer, the technical solutions in embodiments of the present invention would be clearly and completely described below with reference to the drawings in embodiments of the present invention. Apparently, the embodiments described are a part of embodiments of the present invention rather than all of them. All other embodiments obtained by those ordinarily skilled in the art based on the embodiments in the present invention without spending inventive efforts fall within the protection scope of the present invention.

Figure 1:
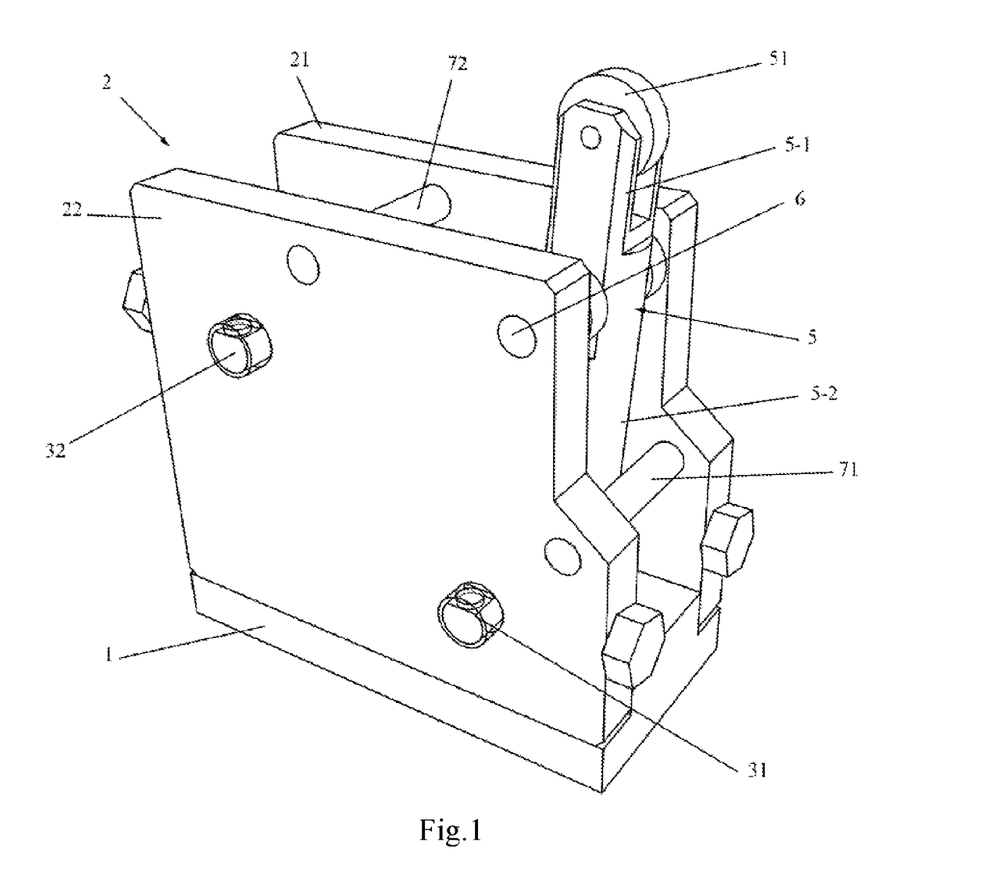
FIG. 1 is a structural schematic view of a detection device according to embodiments of the present invention.
Figure 2:
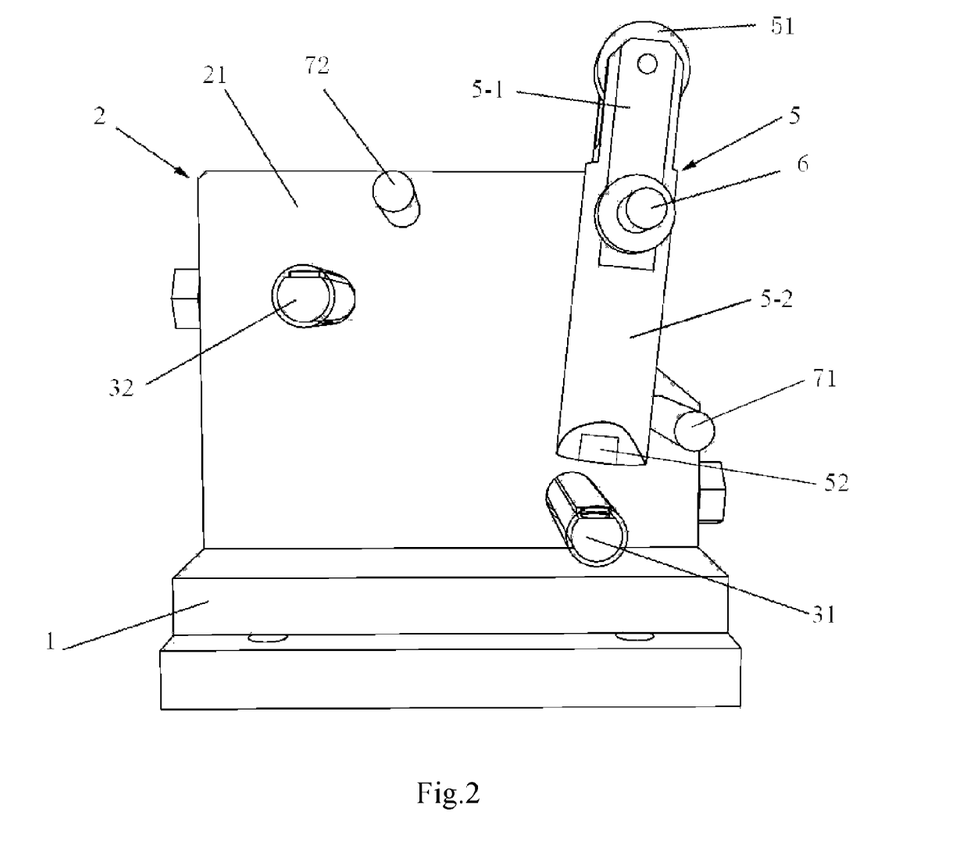
FIG. 2 is a front view of a detection device according to embodiments of the present invention in the case that a bracket plate at one side is removed.

Referring to FIGS. 1 and 2, FIG. 1 shows a stereoscopic view of an embodiment of a detection device according to the present invention, and FIG. 2 shows a view of an embodiment of a detection device according to the present application in the case of removing a bracket plate at one side, wherein the end of the trigger section 5-2 is half-sectioned. The detection device provided by the embodiments of the invention comprises a base 1, a bracket 2, a swing lever 5, a first limit lever 71 and a first magnetic sensor 31. The bracket 2 is provided on the base 1, the swing lever 5 is swingably provided on the bracket 2 via a swing shaft 6, and the swing lever 5 is partitioned as a toggle section 5-1 and a trigger section 5-2 by the swing shaft 6, the weight of the trigger section 5-2 being greater than the weight of the toggle section 5-1. It is to be noted that the weight of the trigger section 5-2 can be set according to the process conditions such as the factors including the weight, the moving speed of a workpiece 4 placed thereon, the weight of the toggle section 5-1, and the like, as long as it can carry out normal detection. The weight of the trigger section 5-2 is not specifically limited in the present embodiment. The end of the trigger section 5-2 is provided with a magnetic block 52. The end of the toggle section 5-1 is higher in an initial state than the upper edge of the bracket 2. The first limit lever 71 is provided on the bracket 2, and the first limit lever 71 is located below the swing shaft 6 for limiting the trigger section 5-2. The first magnetic sensor 31 is provided on the bracket 2, and the first magnetic sensor 31 is located in the vicinity of a virtual extension of the trigger section 5-2 when the trigger section 5-2 is being limited by the first limit lever 71. It is to be noted that, referring to FIG. 2, the first magnetic sensor 31 being located in the vicinity of a virtual extension of the trigger section 5-2 when being limited by the first limit lever 71 indicates that the magnetic block 52 arranged at the end of the trigger section 5-2 can be sufficiently close to the first magnetic sensor 31 when the trigger section 5-2 is being limited by the first limit lever 71, such that the first magnetic sensor 31 can receive the magnetic field of the magnetic block 52.

Figure 3:
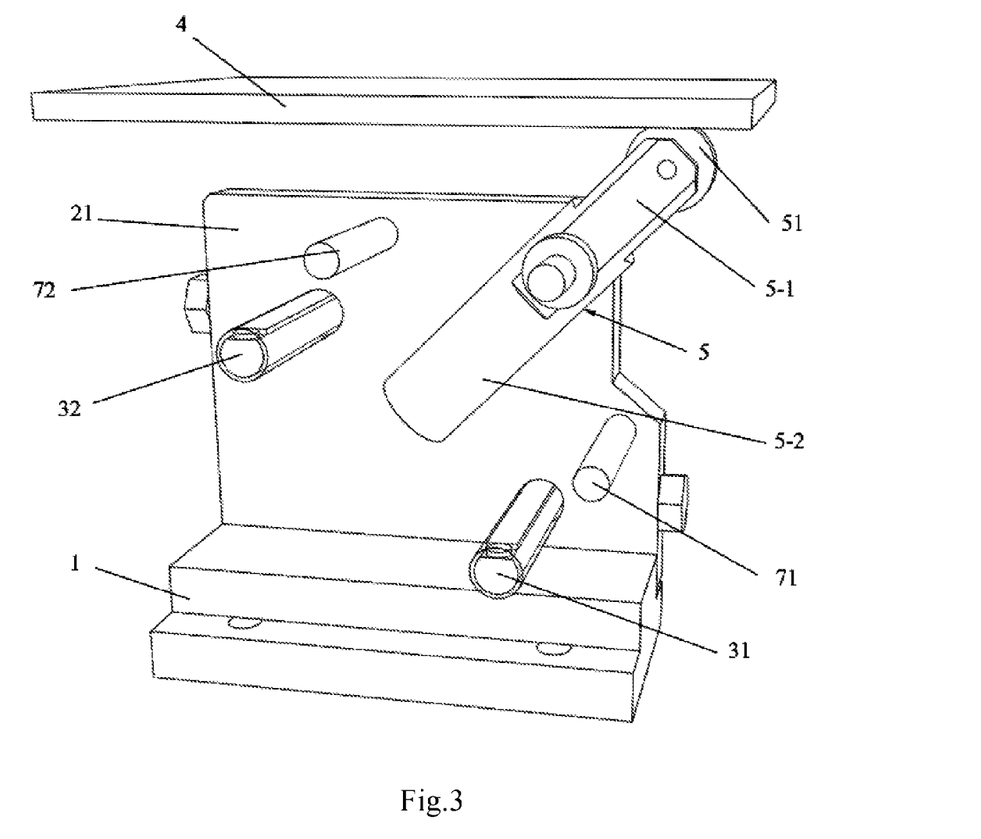
FIG. 3 is a schematic view showing the operation of a detection device according to embodiments of the present invention when a workpiece passes.

In use, the present detection device is mounted at a position below the conveyor section of the workpiece cleaning apparatus, and the conveyor section is composed of a plurality of conveyor rollers arranged at intervals and in parallel with each other so that the toggle section 5-1 protrudes from the gap between the conveyor rollers to a position above the plane where the conveyor rollers are located. Meanwhile, the first magnetic sensor 31 is in communication connection with the control system of the workpiece cleaning apparatus. The detection device is provided with a first limit lever 71 and a first magnetic sensor 31. As shown in FIG. 2, when no workpiece passes, since the weight of the trigger section 5-2 is greater than that of the toggle section 5-1, the trigger section 5-2 is in the lower position and is limited by the first limit lever 71, the magnetic field of the magnetic block 52 on the trigger section 5-2 is detected by the first magnetic sensor 31, the signal detection state of the first magnetic sensor 31 is ON, and the determination state is no a workpiece to be conveyed being detected. As shown in FIG. 3, when the workpiece 4 passes, the workpiece 4 comes into contact with the toggle section 5-1 of the swing lever 5 to cause the swing lever 5 to rotate about the swing shaft 6, and the trigger section 5-2 to be away from the first limit lever 71. Then the magnetic block 52 no longer triggers the first magnetic sensor 31, the signal detection state of the first magnetic sensor 31 is OFF, and the determination state is a workpiece to be conveyed being detected. The above-mentioned detection process is shown in Table 1. The first magnetic sensor 31 sends a detected signal to the control system so as to perform corresponding control. The detection device of the application performs detection in a mechanical and electromagnetic way. The detection of magnetic field signals using a magnetic sensor is not affected by liquid or a humid environment, which can reduce detection errors, improve the accuracy of detection, avoid control errors or false control generated by the controller in the apparatus, reduce equipment failure, and improve the operation ratio and production efficiency. The detection device of the application is simple in structure and easy to implement and install.

TABLE 1

| | First Magnetic Sensor | Determination State |
|---|---|---|
| Signal Detection State | ON | No a workpiece to be conveyed being detected |
| | OFF | A workpiece to be conveyed being detected |

In accordance with another embodiment, the detection device further comprises a second limit lever 72 and a second magnetic sensor 32. The second limit lever 72 is provided on the bracket 2 and the second limit lever 72 is arranged triangularly with the swing shaft 6 and the first limit lever 71 in the plane of the bracket 2. The trigger section 5-2 is used to move between the first limit lever 71 and the second limit lever 72, i.e. the trigger section 5-2 swings between the first limit lever 71 and the second limit lever 72. The second magnetic sensor 32 is provided on the bracket 2 and the second magnetic sensor 32 is located in the vicinity of a virtual extension of the trigger section 5-2 when the trigger section 5-2 is being limited by the second limit lever 72. It is to be noted that, referring to FIG. 2, the second magnetic sensor 32 being located in the vicinity of a virtual extension of trigger section 5-2 when the trigger section 5-2 is being limited by the second limit lever 72 indicates that the magnetic block 52 arranged at the end of the trigger section 5-2 can be sufficiently close to the second magnetic sensor 32 when the trigger section 5-2 is limited by the second limit lever 72 such that the second magnetic sensor 32 can receive the magnetic field of the magnetic block 52.

Figure 4:
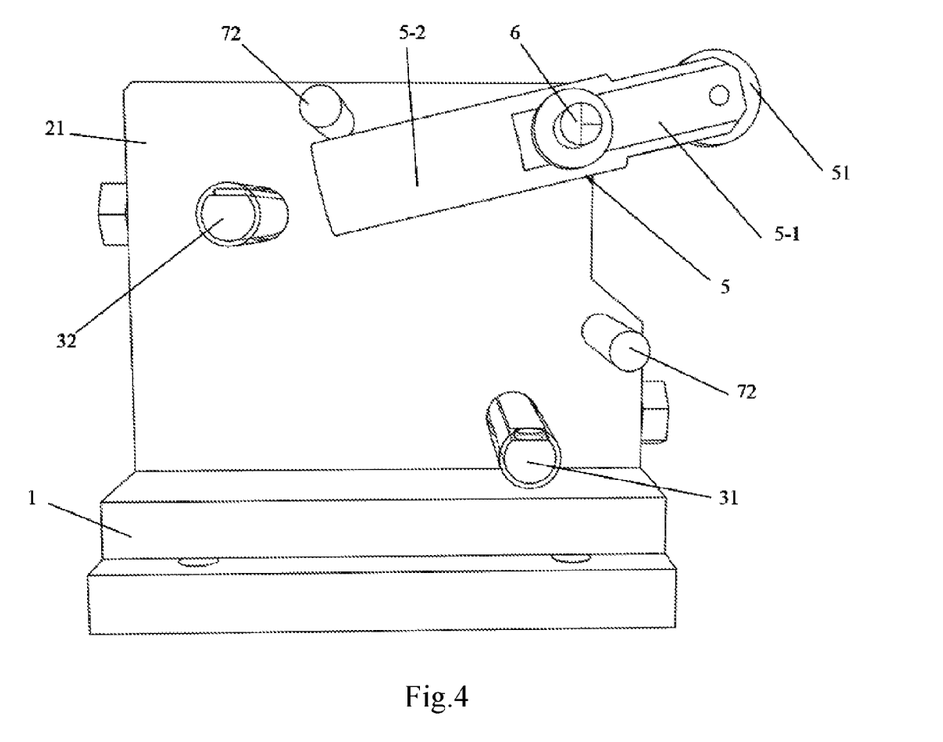
FIG. 4 is a schematic view showing the operation of a detection device according to embodiments of the present invention when the toggle section is indirectly subjected to an excessive pressure from the liquid in use.

When the detection device of the present application is used, it is arranged at a position opposite to the water outlet end of the spray pipe. As shown in Table 2, when the spray pipe is in normal state (regardless of whether there is a workpiece 4 passing through the conveyor section), the toggle section 5-1 of the swing lever 5 only swings under the pressure from the workpiece 4 when passing, but the trigger section 5-2 cannot turn to the position of the second limit lever 72, the second magnetic sensor 32 is in OFF state, and the first magnetic sensor 31 is in ON state or OFF state. As shown in FIG. 4, when an abnormality such as excessive water pressure occurs at the water outlet end of the spray pipe, the cleaning liquid sprayed by the spray pipe would produce a greater impact (downward impact) on the workpiece 4, while the gravity of the trigger section 5-2 will drive the toggle section 5-1 to move in a direction (i.e. upward direction) opposite to the movement direction of the workpiece 4 (that is, the trigger section 5-2 tends to return to the natural droop state). Moreover, since the toggle section 5-1 in natural state would protrude to a position above the plane where the conveyor rollers are located, during the process of the trigger section 5-2 tending to return to natural droop, it would be subjected to the resistance of the workpiece 4 (the depiction of the workpiece 4 is omitted from FIG. 4). Furthermore, when the workpiece 4 is subjected to the greater impact of the cleaning liquid, the workpiece 4 would also produce a greater pressure on the toggle section 5-1 of the swing lever 5 such that the trigger section 5-2 of the swing lever 5 turns to a position close to the second limit lever 72 (at that time the swing lever 5 moves under the effect of inertia, the toggle section 5-1 and the workpiece 4 may be disengaged). At that time, the magnetic field generated by the magnetic block in the trigger section 5-2 is detected by the second magnetic sensor 32 so that the detection state of the second magnetic sensor 32 is ON, while the detection state of the first magnetic sensor 31 is OFF. The control system of the workpiece cleaning apparatus decides whether to issue an alarm signal or not by making determination based on the signals detected by the first magnetic sensor 31 and the second magnetic sensor 32. Accordingly, the detection device of the application is able to detect the abnormalities in the water outlet end of the water pipe, raise the alarm in time, clear the failure and hence avoid unfavorable abnormalities such as incomplete cleaning and remaining water stains upon drying.

TABLE 2

| | First Magnetic Sensor | Second Magnetic Sensor | Determination State |
|---|---|---|---|
| Signal Detection State | ON | OFF | No a workpiece to be conveyed is detected |
| | OFF | OFF | A workpiece to be conveyed is detected |
| | OFF | ON | Abnormality in the spray device |

The above ON refers to a trigger state; the above OFF refers to a non-trigger state.

Preferably, the end of the toggle section is provided with a pulley 51. The end of the toggle section being provided with a pulley 51 can prevent the toggle section from scratching the workpiece and reduce the resistance of the toggle section to the workpiece during the process of conveying the workpiece so that the workpiece conveying process is stabler and quicker.

Preferably, as shown in FIG. 1, the bracket 2 comprises a first bracket plate 21 and a second bracket plate 22 which are parallel to each other. The first bracket plate 21 and the second bracket plate 22 are vertically fixed to the base 1, and the first limit lever 71, the second limit lever 72, and the swing shaft 6 are all disposed across the first bracket plate 21 and the second bracket plate 22. The swing lever 5 swings in a space formed by the first bracket plate 21 and the second bracket plate 22 to make the operation of the detection device more safe and reliable.

Preferably, as shown in FIG. 2, the end of the trigger section 5-2 is provided with a mounting hole in which the magnetic block 52 is provided and then sealed with an end cap. The magnetic block 52 is provided in the mounting hole to avoid damage caused by the collision of the magnetic block 52 with the first limit lever 71 or the second limit lever 72, and thus is more durable.

Preferably, the first limit lever 71 and/or the second limit lever 72, and the swing lever 5 are made of a conductive ultrahigh molecular weight polyethylene material. The conductive ultrahigh molecular weight polyethylene material has good impact resistance and high energy ratio, so that the kinetic energy of the swing lever 5 can be quickly absorbed to reduce swings. Meanwhile, the conductive ultrahigh molecular weight polyethylene material is characterized by abrasion resistance, corrosion resistance and good lubricity, and has certain conductivity, which can reduce the possibility of electrostatic breakdown of the product. Optionally, the base 1, the bracket 2 and the swing shaft 6 may also be made of a conductive ultrahigh molecular weight polyethylene material, so that the detection device has better abrasion resistance, corrosion resistance and lubricity and has certain conductivity, and the possibility of electrostatic breakdown of the product can be reduced.

The working principle of the detection device according to another embodiment is as follows. Corresponding detection is performed based on the signals outputted by the first magnetic sensor 31 and the second magnetic sensor 32. When the detection state of the first magnetic sensor 31 is ON while the detection state of the second magnetic sensor 32 is OFF, it indicates that the swing lever 5 and the first magnetic sensor 31 are close to each other, and the detection device does not detect a workpiece to be conveyed. When the detection states of the first magnetic sensor 31 and the second magnetic sensor 32 are both OFF, it indicates that the swing lever 5 swings to a position between the first magnetic sensor 31 and the second magnetic sensor 32, and the detection device detects a workpiece to be conveyed. When the detection state of the first magnetic sensor 31 is OFF while the detection state of the second magnetic sensor 32 is ON, it indicates that the swing lever 5 and the second magnetic sensor 32 are close to each other, and there is an abnormality (such as excessive water pressure) in the spray device above the detection device, resulting in abnormal cleaning.

Preferably, it is possible to set a time threshold in the control program for the detection signals of the first magnetic sensor 31 and the second magnetic sensor 32 with respect to the devices of the different mechanisms, such as setting a time threshold of 0.1-0.2 second for the first magnetic sensor 31 and the second magnetic sensor 32. When the trigger section 5-2 swings (such as abnormal swing) with a small amplitude for a short time in a liquid environment, the time period in which the first sensor 31 and the second sensor 32 detect the magnetic field signals is smaller than the time threshold set in the control program. The control program is not triggered and would not issue a control signal to the controlled component. On the contrary, when the toggle section 5-1 is in contact with the workpiece 4 moving on the conveyor section, and the trigger section 5-2 swings with a large amplitude for a long time (as in the normal detection process), the time period in which the first magnetic sensor 31 and the second magnetic sensor 32 detect the magnetic field signals is larger than the time threshold set in the control program. The control program is triggered and issues a control signal to the controlled component. Therefore, setting a time threshold in the control program can achieve more accurate, effective detection, reduce the probability of false trigger, and facilitate the maintenance and adjustment of an apparatus.

The present application further provides a workpiece cleaning apparatus comprising at least one detection device according to any one of the above-mentioned embodiments.

In conclusion, the detection device provided by the present application can be applied in a liquid environment to accurately detect the position of a workpiece.

Finally, it is to be noted that, the above embodiments are only used to set forth the technical solution of the present invention, rather than limit it. Although the present invention is described in detail with reference to the above-mentioned embodiments, those ordinarily skilled in the art should understand that they still can amend the technical solutions recited in the above-mentioned embodiments, without making the essence of the corresponding technical solutions depart from the spirit and scope of the technical solutions of the respective embodiments of the present invention. It should be understood that the orientational or positional relationships denoted by the terms "upper", "lower", "inner", "outer", etc are based on the orientational or positional relationships shown in the drawings, which are only to facilitate description of the present application and simplify description, rather than indicate or suggest that the denoted device or element must have a particular orientation and must be constructed and operated in a particular orientation, and hence cannot be understood as limiting the present application. The wording "comprising" does not exclude other elements or steps not listed in the claims. The wording "a" or "an" preceding an element does not exclude a plurality of such elements. The mere fact that certain measures are recited in mutually different dependent claims does not indicate that a combination of these measures cannot be used to advantage. Any reference signs in the claims should not be construed as limiting the scope.

The invention claimed is:

1. A detection device, comprising a base, a bracket, a swing lever, a first limit lever and a first magnetic sensor, the bracket being provided on the base, the swing lever being swingably provided on the bracket via a swing shaft and the swing lever being partitioned as a toggle section and a trigger section by the swing shaft, the weight of the trigger section being greater than the weight of the toggle section; an end of the trigger section being provided with a magnetic block, an end of the toggle section being higher in an initial state than an upper edge of the bracket; the first limit lever being provided on the bracket for limiting the trigger section; the first magnetic sensor being provided on the bracket and located in the vicinity of a virtual extension of the trigger section when the trigger section is being limited by the first limit lever,
    wherein the detection device further comprises a second limit lever and a second magnetic sensor, the second limit lever is provided on the bracket and arranged triangularly with the swing shaft and the first limit lever in a plane of the bracket, the trigger section is able to swing between the first limit lever and the second limit lever, and the second magnetic sensor is provided on the bracket and located in the vicinity of a virtual extension of the trigger section when the trigger section is being limited by the second limit lever.

2. The detection device according to claim 1, wherein the bracket comprises a first bracket plate and a second bracket plate arranged in parallel with each other and spaced apart, the first bracket plate and the second bracket plate are vertically fixed to the base, and the limit lever and the swing shaft are both disposed across the first bracket plate and the second bracket plate.

3. The detection device according to claim 1, wherein an end of the toggle section is provided with a pulley.

4. The detection device according to claim 1, wherein an end of the trigger section is provided with a mounting hole in which the magnetic block is arranged and sealed with an end cap.

5. The detection device according to claim 1, wherein at least one of the first limit lever and the swing lever is made of a conductive ultrahigh molecular weight polyethylene material.

6. The detection device according to claim 1, wherein the second limit lever is made of a conductive ultrahigh molecular weight polyethylene material.

7. The detection device according to claim 1, wherein at least one of the base, the bracket and the swing lever is made of a conductive ultrahigh molecular weight polyethylene material.

8. The detection device according to claim 1, wherein the detection device generates a corresponding detection result in the event that a time period in which the magnetic sensor continuously detects a magnetic field signal exceeds a time threshold.

9. The detection device according to claim 1, wherein the trigger section of the swing lever is close to the first magnetic sensor in an initial state and gets away from the first magnetic sensor under the effect of a gravity applied by a workpiece that passes over the detection device, so as to detect whether the workpiece passes over the device.

10. The detection device according to claim 1, wherein the trigger section of the swing lever is close to the first magnetic sensor in an initial state and gets away from the first magnetic sensor under the effect of a gravity applied by a workpiece that passes over the detection device, so as to detect whether the workpiece passes over the device, and the trigger section of the swing lever gets close to the second magnetic sensor under the effect of an excessive pressure applied on the workpiece by a cleaning liquid sprayed by a spray device, so as to detect whether the spray device is normal or not.

11. A workpiece cleaning apparatus; comprising at least one detection device, the detection device comprising a base, a bracket, a swing lever, a first limit lever and a first magnetic sensor, the bracket being provided on the base, the swing lever being swingably provided on the bracket via a swing shaft and the swing lever being partitioned as a toggle section and a trigger section by the swing shaft, the weight of the trigger section being greater than the weight of the toggle section; an end of the trigger section being provided with a magnetic block, an end of the toggle section being higher in an initial state than an upper edge of the bracket; the first limit lever being provided on the bracket for limiting the trigger section; the first magnetic sensor being provided on the bracket and located in the vicinity of a virtual extension of the trigger section when the trigger section is being limited by the first limit lever, wherein the detection device further comprises a second limit lever and a second magnetic sensor, the second limit lever is provided on the bracket and arranged triangularly with the swing shaft and the first limit lever in a plane of the bracket, the trigger section is able to swing between the first limit lever and the second limit lever, and the second magnetic sensor is provided on the bracket and located in the vicinity of a virtual extension of the trigger section when the trigger section is being limited by the second limit lever.

12. The workpiece cleaning apparatus according to claim 11, wherein the bracket comprises a first bracket plate and a second bracket plate arranged in parallel with each other and spaced apart, the first bracket plate and the second bracket plate are vertically fixed to the base, and the limit lever and the swing shaft are both disposed across the first bracket plate and the second bracket plate.

13. The workpiece cleaning apparatus according to claim 11, wherein an end of the toggle section is provided with a pulley.

14. The workpiece cleaning apparatus according to claim 11, wherein an end of the trigger section is provided with a mounting hole in which the magnetic block is arranged and sealed with an end cap.

15. The workpiece cleaning apparatus according to claim 11, wherein at least one of the first limit lever and the swing lever is made of a conductive ultrahigh molecular weight polyethylene material.

16. The workpiece cleaning apparatus according to claim 11, wherein the detection device generates a corresponding detection result in the event that a time period in which the magnetic sensor continuously detects a magnetic field signal exceeds a time threshold.

17. The workpiece cleaning apparatus according to claim 11, wherein the trigger section of the swing lever is close to the first magnetic sensor in an initial state and gets away from the first magnetic sensor under the effect of a gravity applied by a workpiece that passes over the detection device, so as to detect whether the workpiece passes over the device.

18. The workpiece cleaning apparatus according to claim 11, wherein the trigger section of the swing lever is close to the first magnetic sensor in an initial state and gets away from the first magnetic sensor under the effect of a gravity applied by a workpiece that passes over the detection device, so as to detect whether the workpiece passes over the device, and the trigger section of the swing lever gets close to the second magnetic sensor under the effect of an excessive pressure applied on the workpiece by a cleaning liquid sprayed by a spray device, so as to detect whether the spray device is normal or not.

19. The workpiece cleaning apparatus according to claim 11, wherein the second limit lever is made of a conductive ultrahigh molecular weight polyethylene material.

20. The workpiece cleaning apparatus according to claim 11, wherein at least one of the base, the bracket and the swing lever is made of a conductive ultrahigh molecular weight polyethylene material.

\* \* \* \* \*